(12) United States Patent
Lin et al.

(10) Patent No.: US 8,363,318 B2
(45) Date of Patent: Jan. 29, 2013

(54) PROJECTING LENS AND PROJECTING APPARATUS USING THE SAME

(75) Inventors: Ming-Kuen Lin, Yunlin County (TW); Tsung-Hsun Wu, Taoyuan County (TW)

(73) Assignee: Qisda Corporation, Taoyuan County (TW)

( * ) Notice: Subject to any disclaimer, the term of this patent is extended or adjusted under 35 U.S.C. 154(b) by 499 days.

(21) Appl. No.: 12/651,491

(22) Filed: Jan. 4, 2010

(65) Prior Publication Data
US 2010/0172022 A1 Jul. 8, 2010

(30) Foreign Application Priority Data
Jan. 5, 2009 (TW) ............................... 98100076 A

(51) Int. Cl.
*G02B 23/24* (2006.01)
(52) U.S. Cl. ........................................ 359/434; 359/792
(58) Field of Classification Search .......... 359/362–366, 359/432, 434, 435, 754–757, 763, 764, 771, 359/772, 780, 784, 792, 796, 797; 353/28, 353/30, 39, 81, 82, 94, 97
See application file for complete search history.

(56) References Cited

U.S. PATENT DOCUMENTS
4,474,459 A * 10/1984 Tokumaru ........................ 355/46
2007/0184368 A1* 8/2007 Nishikawa et al. ............. 430/30

FOREIGN PATENT DOCUMENTS
CN 1524385 A 8/2004
WO 02079858 A2 10/2002

OTHER PUBLICATIONS
Office Action cited in the counterpart application by CN Patent Office on Mar. 1, 2011.

* cited by examiner

*Primary Examiner* — Stephone Allen
*Assistant Examiner* — Jyotsna Dabbi

(57) ABSTRACT

A projecting lens for projecting a light of an image generating device onto a screen is provided. The image generating device has a light valve. The projecting lens includes a first lens group and a second lens group. The first lens group has an imaging optical axis and a first effective refractive power. The second lens group has a second effective refractive power, and is disposed between the first lens group and the light valve. The light projected from the light valve to the second lens group generates an intermediate image, which is focused on the screen via the first lens group to form an image. A center of the image and a center of the light valve are located on the same side of the optical axis, and a center of the intermediate image is located on the other side of the optical axis.

16 Claims, 4 Drawing Sheets

PROJECTING LENS AND PROJECTING APPARATUS USING THE SAME

This application claims the benefit of Taiwan application Serial No. 98100076, filed Jan. 5, 2009, the subject matter of which is incorporated herein by reference.

BACKGROUND OF THE INVENTION

1. Field of the Invention

The invention relates in general to a projecting lens, and more particularly to a projecting lens with wide angle and a projecting apparatus using the same.

2. Description of the Related Art

To project an image at a big space such as a big conference room or a hall, a bigger projecting frame is required. However, the size of the projecting frame of the projecting apparatus is subject to the structural design of the projecting lens. Thus, a wide-angle projecting lens is commonly used in the projecting apparatus. Conventionally, the design of the wide-angle projecting lens is based on first imaging principle, which would normally lead to the problems such as the front lens group being too big, and require other elements such as the reflective mirror or the lens with specific lens surface.

SUMMARY OF THE INVENTION

The invention is directed to a projecting lens and a projecting apparatus using the same, which have the advantages of super wide angle and easy assembly.

According to a first aspect of the present invention, a projecting lens for projecting a light of an image generating device onto a screen is provided. The image generating device has a light valve. The projecting lens includes a first lens group and a second lens group. The first lens group has an imaging optical axis and a first effective refractive power. The second lens group has a second effective refractive power, and is disposed between the first lens group and the light valve. The light projected from the light valve to the second lens group generates an intermediate image, which is focused on the screen via the first lens group to form an image. A center of the image and a center of the light valve are located on the same side of the optical axis, and a center of the intermediate image is located on the other side of the optical axis.

According to a second aspect of the present invention, a projecting apparatus for projecting an image onto a screen is provided. The projecting apparatus includes a projecting lens and an image generating device. The image generating device has a light valve. The projecting lens includes a first lens group and a second lens group. The first lens group has an imaging optical axis and a first effective refractive power. The second lens group has a second effective refractive power, and is disposed between the first lens group and the light valve. The light valve transmits a projecting light generated by the image generating device to the projecting lens, wherein the projecting light generates an intermediate image via the second lens group. The intermediate image is then focused on the screen via the first lens group to form an image. A center of the image and a center of the light valve are located on the same side of the optical axis, and a center of the intermediate image is located on the other side of the optical axis.

The invention will become apparent from the following detailed description of the preferred but non-limiting embodiments. The following description is made with reference to the accompanying drawings.

DETAILED DESCRIPTION OF THE INVENTION

Figure 1:
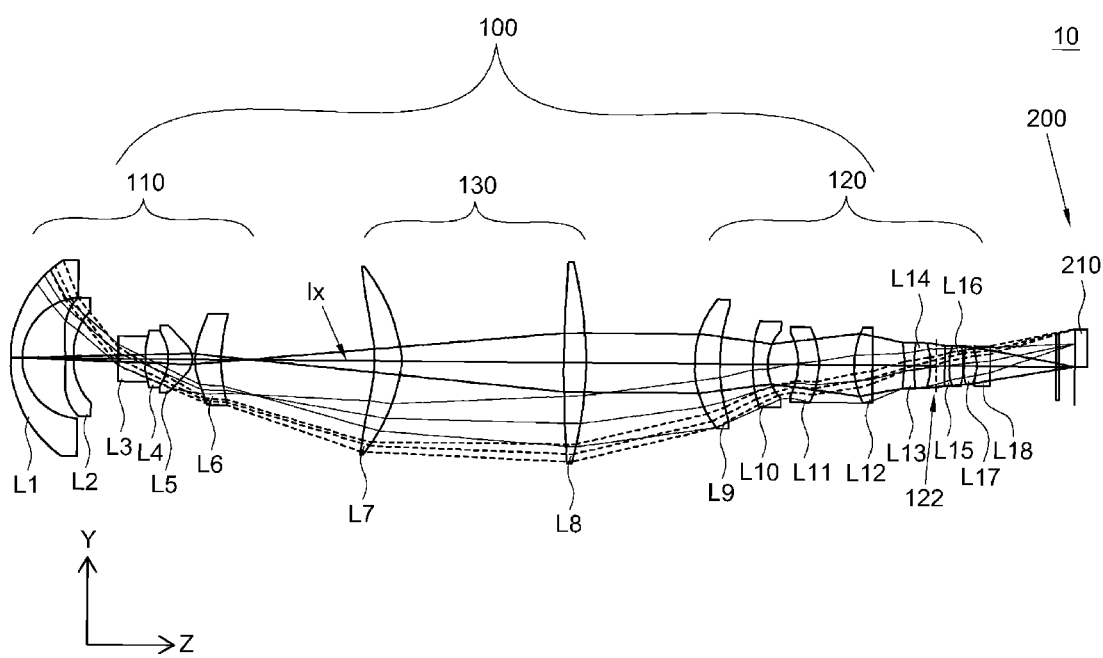
FIG. 1 shows a projecting apparatus according to a preferred embodiment of the invention.

Referring to FIG. 1, a projecting apparatus according to a preferred embodiment of the invention is shown. The projecting apparatus 10 includes a projecting lens 100 and an image generating device 200. The image generating device 200 has a light valve 210 for providing an image projecting light to the projecting lens 100, such as but not limited to a digital micro-mirror device (DMD), and any device capable of achieving the above function will be adopted. The projecting lens 100 includes a first lens group 110 and a second lens group 120, wherein the second lens group 120 is disposed between the first lens group 110 and the light valve 210. The first lens group 110 has an imaging optical axis Ix and a first effective refractive power. The second lens group 120 has a second effective refractive power. As indicated in FIG. 1, the projecting lens 100 further includes a third lens group 130 which is disposed between the first lens group 110 and the second lens group 120 and has a third effective refractive power. In the present embodiment of the invention, the first effective refractive power, the second effective refractive power and the third effective refractive power of the first lens group 110, the second lens group 120 and the third lens group 130 respectively are a positive effective refractive power.

Figure 2:
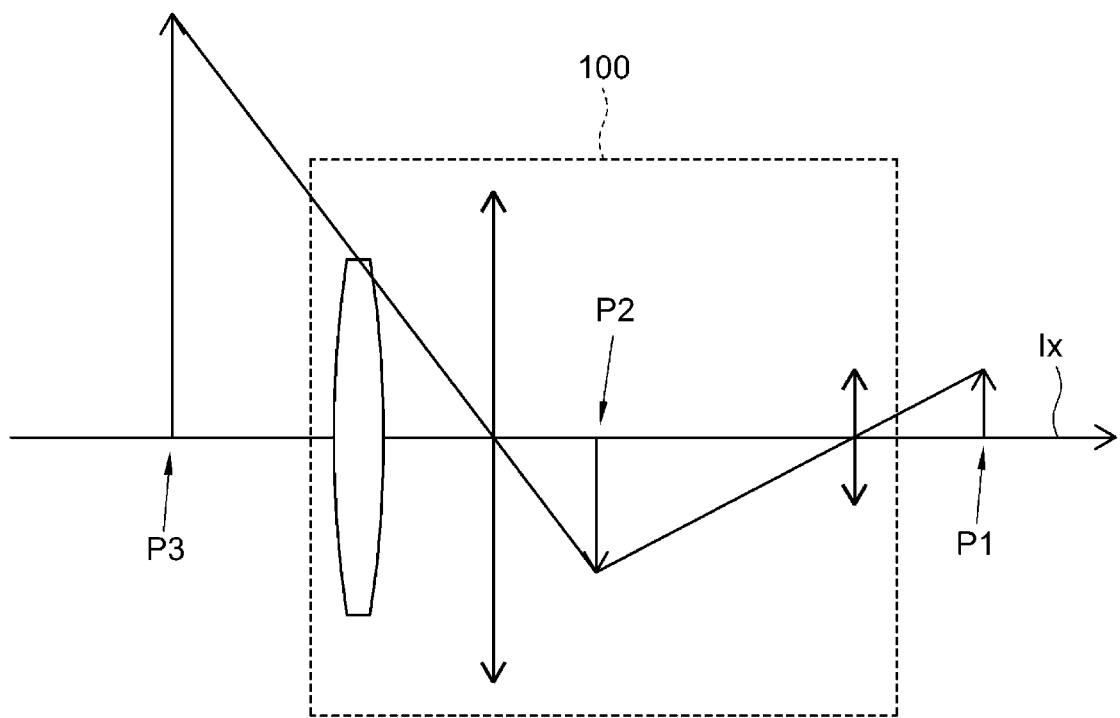
FIG. 2 shows a projecting apparatus using second imaging principle of the present embodiment of the invention.

Referring to FIG. 2, a projecting apparatus using second imaging principle of the present embodiment of the invention is shown. The light valve 210 is disposed at a position P1, and after the light is projected to the projecting lens 100, an inverted intermediate image is generated at a position P2. Next, the intermediate image forms an enlarged erect image on the screen at a position P3 via the projecting lens 100.

In FIG. 1, the light valve 210 transmits a projecting light generated by the image generating device 200 to the projecting lens 100, wherein the projecting light generates an intermediate image via the second lens group 120. The third lens group 130 transmits the intermediate image to the first lens group 110, so that the deviation from the imaging optical axis Ix to the light is projected to the first lens group 110 is reduced. The intermediate image is focused on the screen 300 (referring to FIG. 4) via the first lens group 110 to form an image. The projecting lens 100 of the present embodiment of the invention enables a center of the image and a center of the light valve 210 to be located on the same side of the imaging optical axis Ix, and enables a center of the intermediate image to be located on the other side of the optical axis Ix. The composition of each lens group is elaborated below.

Figure 3:
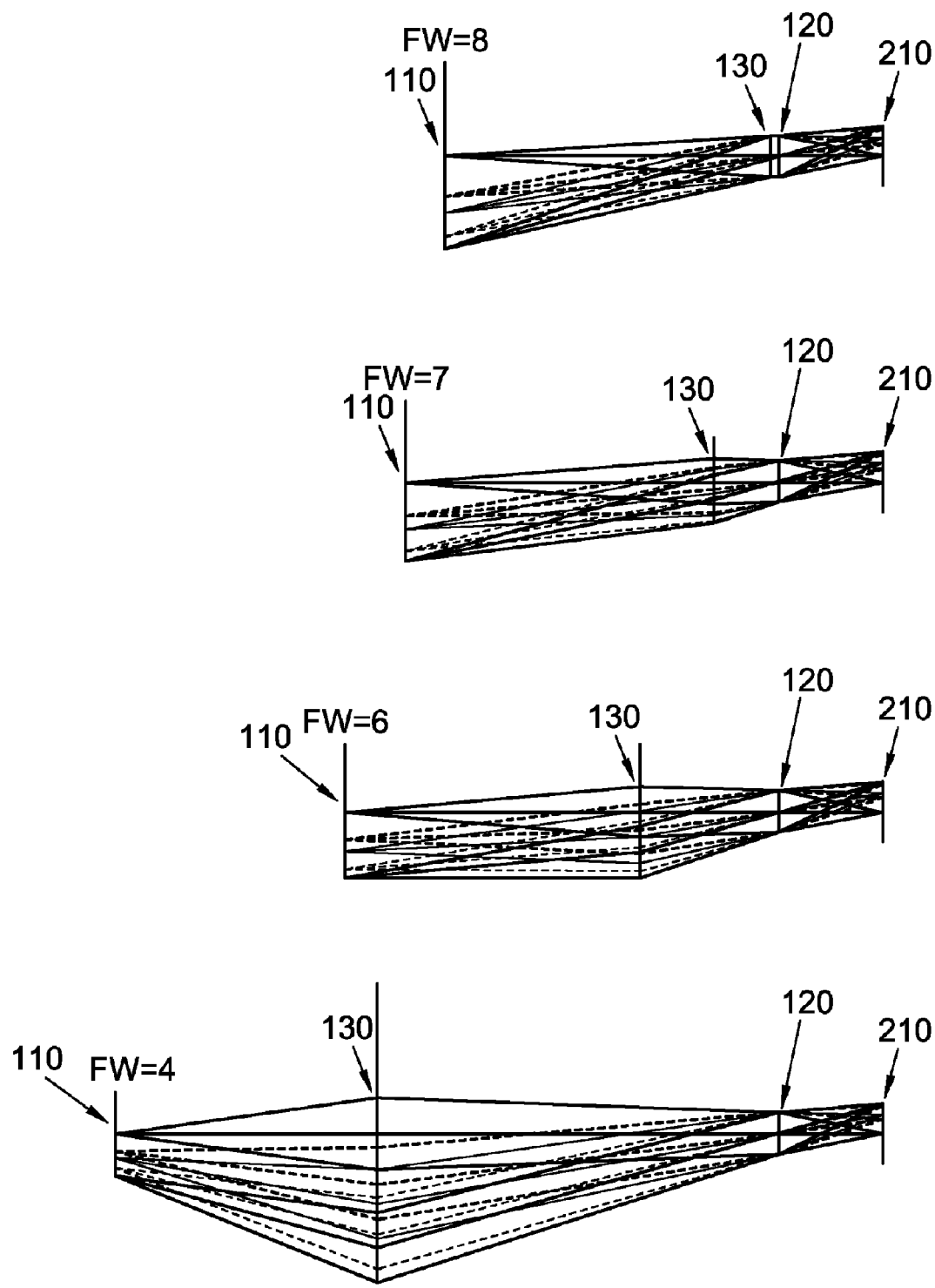
FIG. 3 shows simulation diagrams of the optical path of the wide-angle lens set under different focal distances.

The first lens group 110 is a wide-angle lens set, and the preferable range of the effective focal distance Fw is expressed as: 4 mm≦Fw≦7 mm. Referring to FIG. 3, simulation diagrams of the optical path of the wide-angle lens set under different focal distances are shown. When the effective focal distance Fw is smaller than the lower limit, that is, 4 mm (referring to the bottommost diagram), the total length of the projecting lens 100 increases rapidly, and the design of the wide-angle lens set becomes more complicated. When the effective focal distance Fw is greater than the upper limit, which is, 7 mm (referring to the topmost diagram), the lens of the wide-angle lens set is too big, the manufacturing also becomes more complicated and the other two lens groups 130 and 120 are interfered. Preferably, the effective focal distance Fw is limited to the range of 4 mm to 7 mm so as to avoid the above problems. As indicated in FIG. 1, the first lens group 110 is composed of several lenses such as the lenses L1~L6. In terms of a preferred embodiment, the lens L1 is a convex-concave lens, the lens L2 is a double-concave lens, the lens L3 is a convex-concave lens, the lens L4 is a double-convex lens, the lens L5 is a concave-convex lens, and the lens L6 is also a convex-concave lens.

The third lens group 130 is a field lens set for example, and the preferable range of the effective focal distance Ff is expressed as: 75 mm≦Ff≦95 mm. The third lens group 130 can be composed by the lenses L7 and L8. In terms of a preferred embodiment, the lens L7 is a concave-convex lens, and the lens L8 is a double-convex lens.

The second lens group 120 is a relay lens set for example, and the preferable range of the effective focal distance Fr is expressed as: 35 mm≦Fr≦55 mm. The second lens group 120 includes a shutter 122, which is used for controlling the flux of the projecting light. The second lens group 120 can be composed by several lenses such as the lenses L9~L18. In terms of a preferred embodiment, the lens L9 is a convex-concave lens, the lens L10 is a convex-concave lens, the lens L11 is a concave-convex lens, the lens L12 is a convex-concave lens, the lens L13 is a double-concave lens, the lens L14 is a double-convex lens, the lens L15 is a convex-concave lens, the lens L16 is a double-convex lens, the lens L17 is a double-convex lens, and the lens L18 is a concave-convex lens.

The projecting view angle of the projecting lens 100 is at least 120 degrees, and the relationship between the distance d from the projecting lens 100 to the screen 300 and the width W of the screen 300 is expressed as: d/W≦1. For example, when the distance d from the projecting lens 100 to the screen 300 is 1 m, the image can be projected onto a 100 cm-wide screen.

Figure 4:
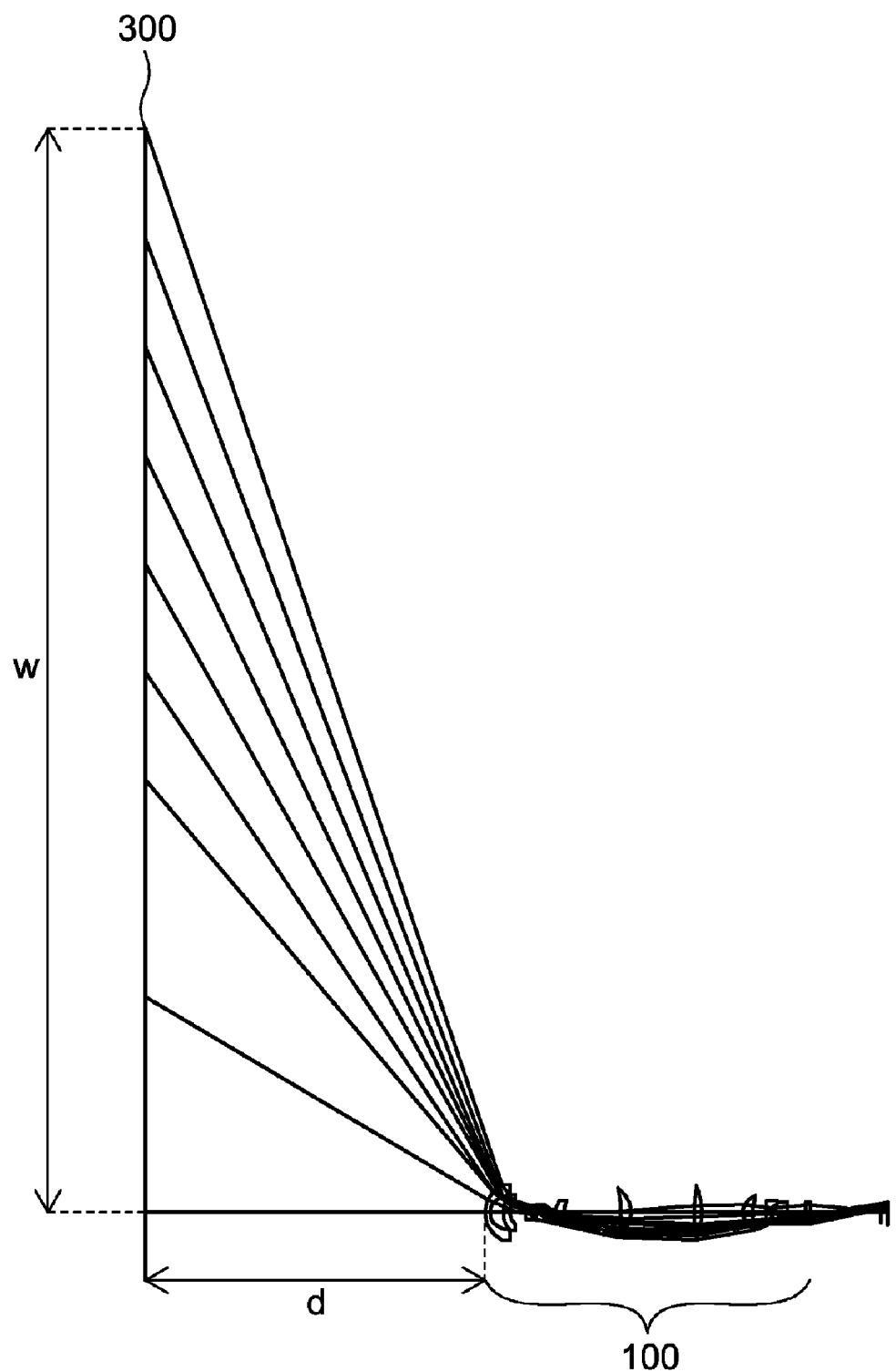
FIG. 4 shows a simulation diagram of the projecting apparatus of FIG. 1 according to the data of Table 1.

The optical data and the disposition of each lens of the first lens group 110, the second lens group 120 and the third lens group 130 for the simulation of the projecting apparatus of the present embodiment of the invention are collected in Table 1. However, the technology of the invention is not limited thereto. The lens data are listed in Table 1 according to the sequence of the lenses disposed between the screen 300 and the light valve 210. Referring to FIG. 4, a simulation diagram of the projecting apparatus of FIG. 1 according to the data of Table 1 is shown.

TABLE 1

| Lens | *Lens Surface | Curvature Radius (m) | Thickness/ Distance (mm) | Refractive Index Nd, Abbe Number |
|---|---|---|---|---|
| L1 | 1 | 0.0277 | 3.3959 | 1.806, 40.9 |
|  | 2 | 0.0556 | 13.0121 |  |
| L2 | 3 | −0.0113 | 2.5144 | 1.531, 56.0 |
|  | 4 | 0.0358 | 1.3170 |  |
|  | 5 | 0.0000 | 11.9037 |  |
| L3 | 6 | 0.0091 | 8.0000 | 1.805, 25.4 |
| L4 | 7 | 0.0455 | 6.9664 | 1.697, 48.5 |
|  | 8 | −0.0660 | 1.7531 |  |
| L5 | 9 | −0.1886 | 5.4878 | 1.625, 35.7 |
|  | 10 | −0.1770 | 0.7390 |  |
| L6 | 11 | 0.0642 | 7.7419 | 1.805, 25.4 |
|  | 12 | 0.0535 | 46.0616 |  |
| L7 | 13 | −0.0301 | 8.0000 | 1.531, 56.0 |
|  | 14 | −0.0354 | 48.5608 |  |
| L8 | 15 | 0.0025 | 6.5885 | 1.755, 52.3 |
|  | 16 | −0.0088 | 32.4716 |  |
| L9 | 17 | 0.0334 | 7.7425 | 1.743, 49.3 |
|  | 18 | 0.0163 | 9.5336 |  |

TABLE 1-continued

| Lens | *Lens Surface | Curvature Radius (m) | Thickness/ Distance (mm) | Refractive Index Nd, Abbe Number |
|---|---|---|---|---|
| L10 | 19 | 0.0234 | 4.4020 | 1.784, 26.3 |
|  | 20 | 0.0681 | 9.4430 |  |
| L11 | 21 | −0.0461 | 6.1312 | 1.805, 25.4 |
|  | 22 | −0.0386 | 10.5004 |  |
| L12 | 23 | 0.0406 | 5.4904 | 1.805, 25.4 |
|  | 24 | 0.0026 | 10.0033 |  |
| L13 | 25 | −0.0393 | 2.6426 | 1.806, 40.9 |
| L14 | 26 | 0.0356 | 5.1009 | 1.620, 60.2 |
|  | 27 | −0.0451 | 4.3934 |  |
| L15 | 28 | −0.0027 | 1.2645 | 1.755, 27.5 |
| L16 | 29 | 0.0586 | 4.4606 | 1.497, 81.5 |
|  | 30 | −0.0425 | 0.1000 |  |
| L17 | 31 | 0.0384 | 3.9240 | 1.516, 64.1 |
| L18 | 32 | −0.0563 | 4.0471 | 1.805, 25.4 |
|  | 33 | −0.0030 | 24.0000 |  |
|  | 34 | 0.0000 | 1.0500 | 1.487, 70.2 |
|  | 35 | 0.0000 | 0.55 |  |

*The lens surfaces are sequentially numbered from the lens surface close to the screen 300 towards the light valve 210.

The distance d (referring to FIG. 4) from the lens L1 of the first lens group 110 to the screen 300 is about 270 mm, and the distance from the lens L17 of the second lens group 120 to the light valve 210 is about 4.5656 mm. The effective focal distance Fw of the first lens group 110 is 5.14 mm, the effective focal distance Ff of the third lens group 130 is 85.6 mm, and the effective focal distance Fr of the second lens group 120 is 46.47 mm. The effective focal distance formed by the three lens groups is about 2.8 mm. As indicated in FIG. 4, the projecting view angle of the projecting lens 100 is about 152 degrees and is conformed to the requirement of a wide-angle (the view angle at least is 100 degrees) projecting lens or a super-wide-angle (the view angle at least is greater than 120 degrees) projecting lens.

The design of a conventional projecting lens is based on first imaging principle, and leads to an inverted physical image. As the light valve and the image are located on different sides of the optical axis, the front lens group is too big, the manufacturing becomes more difficult and the requirement of super wide-angle projecting lens is hard to meet. To achieve a shorter projecting distance from screen to projector, the non-axial reflective mirror technology is widely used. According to the non-axial reflective mirror technology, the reflective mirror is off-axis and the size is too big, making the assembly and manufacturing of the reflective mirror more complicated and difficult. Unlike the conventional projecting lens and projecting apparatus, the projecting lens and the projecting apparatus of the present embodiment of the invention are based on second imaging principle, and all lens groups are disposed on the same axis, making the assembly easier. Besides, the lens groups of the projecting lens of the present embodiment of the invention can be formed by existing lenses, so that there is no need to manufacture optical elements such as lens with specific lens surface or any reflective mirror.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projecting lens for projecting a light of an image generating device onto a screen, wherein the image generating device has a light valve, and the projecting lens comprises:
   a first lens group having an imaging optical axis and a first effective refractive power; and
   a second lens group having a second effective refractive power, wherein the second lens group is disposed between the first lens group and the light valve;
   wherein the light projected from the light valve to the second lens group generates an intermediate image, which is focused on the screen via the first lens group to form an image;
   wherein the image optical axis of the first lens group has two sides, and a center of the image and a center of the light valve are located on the same side of the imaging optical axis of the first lens group, and a center of the intermediate image is located on the other side of the imaging optical axis of the first lens group;
   wherein the first effective refractive power is a first positive effective refractive power, and the second effective refractive power is a second positive effective refractive power;
   wherein the first lens group is a wide-angle lens set, and a projecting view angle of the wide-angle lens set is at least 120 degrees.

2. The projecting lens according to claim 1, further comprising:
   a third lens group disposed between the first lens group and the second lens group, wherein the third lens group is a field lens set and has a third positive effective refractive power, and the third lens group is used for transmitting the intermediate image to the first lens group.

3. The projecting lens according to claim 2, wherein the field lens set has an effective focal distance Ff and a range of the effective focal distance Ff of the field lens set is expressed as: 75 millimeter (mm)≦Ff≦95 mm.

4. The projecting lens according to claim 1, wherein the wide-angle lens set has an effective focal distance Fw and a range of the effective focal distance Fw of the wide-angle lens set is expressed as: 4 mm≦Fw≦7 mm.

5. The projecting lens according to claim 1, wherein the second lens group has an effective focal distance Fr and a range of the effective focal distance Fr of the second lens group is expressed as: 35 mm≦Fr≦55 mm.

6. The projecting lens according to claim 1, wherein the second lens group comprises a shutter, which is used for controlling a flux of the projecting light.

7. The projecting lens according to claim 1, wherein a relationship between a distance d from the projecting lens to the screen and a width W of the screen is expressed as: d/W≦1.

8. A projecting apparatus for projecting an image onto a screen, wherein the projecting apparatus comprises:
   a projecting lens, comprising:
      a first lens group having an imaging optical axis and a first effective refractive power; and
      a second lens group having a second effective refractive power; and
   an image generating device having a light valve, wherein the second lens group is disposed between the first lens group and the light valve, and the light valve transmits a projecting light generated by the image generating device to the projecting lens;
   wherein the projecting light generates an intermediate image via the second lens group, and the intermediate image is focused on the screen via the first lens group to form an image;
   wherein the imaging optical axis of the first lens group has two sides, and a center of the image and a center of the light valve are located on the same side of the imaging optical axis of the first lens group, and a center of the intermediate image is located on the other side of the imaging optical axis of the first lens group;
   wherein the first effective refractive power is a first positive effective refractive power, and the second effective refractive power is a second positive effective refractive power;
   wherein the first lens group is a wide-angle lens set, and a projecting view angle of the wide-angle lens set is at least 120 degrees.

9. The projecting apparatus according to claim 8, wherein the projecting lens further comprises:
   a third lens group disposed between the first lens group and the second lens group, wherein the third lens group has a third positive effective refractive power, and is used for transmitting the intermediate image to the first lens group.

10. The projecting apparatus according to claim 9, wherein the third lens group is a field lens set.

11. The projecting apparatus according to claim 10, wherein the field lens set has an effective focal distance Ff and a range of the effective focal distance Ff of the field lens set is expressed as: 75 mm≦Ff≦95 mm.

12. The projecting apparatus according to claim 8, wherein the wide-angle lens set has an effective focal distance Fw and a range of the effective focal distance Fw of the wide-angle lens set is expressed as: 4 mm≦Fw≦7 mm.

13. The projecting apparatus according to claim 8, wherein the second lens group is a relay lens set.

14. The projecting apparatus according to claim 13, wherein the relay lens set has an effective focal distance Fr and a range of the effective focal distance Fr of the relay lens set is expressed as: 35 mm≦Fr≦55 mm.

15. The projecting apparatus according to claim 14, wherein the second lens group comprises a shutter, which is used for controlling a flux of the projecting light.

16. The projecting apparatus according to claim 8, wherein a relationship between a distance d from the projecting lens to the screen and a width W of the screen is expressed as: d/W≦1.

* * * * *